Patented Aug. 1, 1939

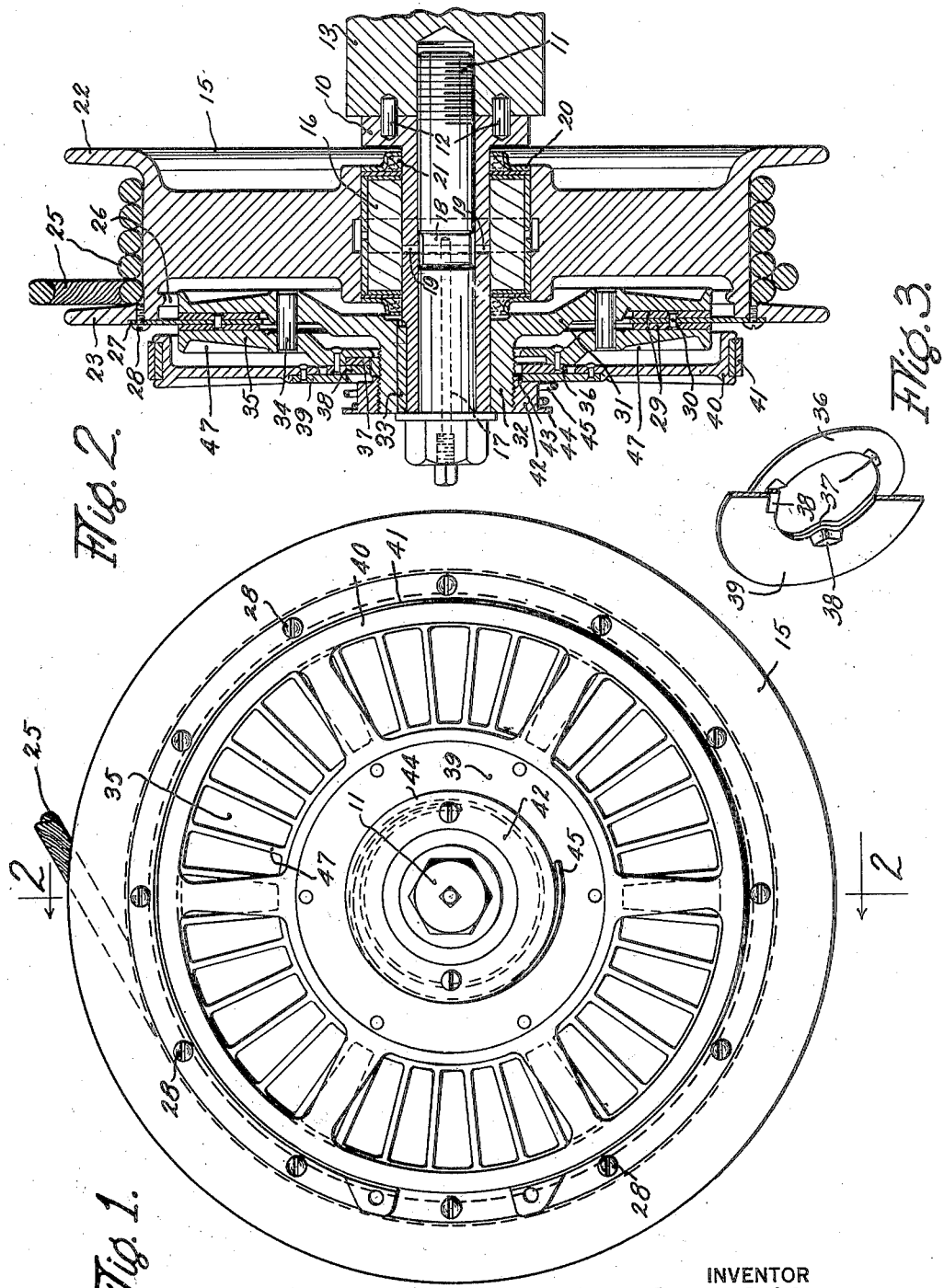

2,167,769

UNITED STATES PATENT OFFICE 2,167,769

DIPPER TRIP AND TAG LINE WINDER

George G. Morin and Emile J. Carleton, Holyoke, Mass.; said Carleton assignor to said Morin Original application November 19, 1935, Serial No. 50,554. Divided and this application August 3, 1937, Serial No. 157,176

8 Claims. (Cl. 192—36)

This invention relates to excavating machinery of the type of shovels, cranes, and scoops, and has particular reference to an improved dipper trip or tag line mechanism.

Among the objects of the invention is to provide a simplified structure for the purpose which is economical to manufacture, which is easily assembled or disassembled, and in which heat generated in the clutch mechanism is efficiently and quickly dissipated.

A further object is to provide a mechanism of this character which may be quickly and easily changed to control either a dipper trip or a tag line.

Other and further objects residing in the details of construction will be apparent from the following specification and claims.

This application is a division of our prior copending applicatiton Serial No. 50,554, filed November 19, 1935, upon which Patent 2,094,278 issued September 28, 1937.

In the accompanying drawing which illustrates one embodiment of the invention,

Fig. 1 is a side view of the device;

Fig. 2 is a sectional view taken substantially on line 2—2 on Fig. 1; and

Fig. 3 is a perspective view, partly in section, showing the clutch operating cams.

Referring to the drawing, 10 indicates a hollow shaft adapted to be secured by means of a threaded stud 11 and pins 12 to the end of a shaft 13. Shaft 13 is constantly driven from any suitable source of power, not shown, and thereby the hollow shaft 10 is also constantly power driven. A drum 15 is mounted on shaft 13 for free rotation thereon by means of roller bearings 16. As shown, lubricant is supplied to the bearings through a longitudinal duct 17 and an annular channel 18 formed in stud 11, ports 19 in the shaft 10 giving the lubricant access to the bearings from the channel 18. Oil retaining washers 20, press fitted or otherwise secured in the hub of the drum, and suitable packings 21, held in place by the washers, are arranged at the ends of the bearings 16 and the drum is permitted a slight movement longitudinally of the shaft 10 for a purpose later described.

Drum 15 is provided with spaced peripheral flanges 22 and 23 between which the dipper trip cable 25 is wound. At least one of the peripheral flanges of the drum is offset from the spokes of the drum to provide a recess 26, and an annular friction plate 27 is secured to the outer face of the adjacent flange as by screws 28. The plate 27 is provided on its opposite faces with friction members 29 secured thereto by rivets 30, the plate 27 with members 29 forming one member of a friction clutch.

Secured to the outer end of shaft 10 is a disk or wheel-like member 31 which forms part of the second member of the clutch. Member 31 is formed with a hub portion 32 press fitted on the shaft and keyed thereto as at 33. The peripheral portion of member 31 nests in recess 26 between the body of the drum and annular plate 27. Member 31 is provided, radially inwardly of plate 27, with a plurality of pins 34 upon which are slidably mounted an annular member 35 forming the second part of the driving member of the clutch. The outer peripheral portion of member 35 engages the friction member 29 on the side of plate 27 opposite that engaged by member 31.

The inner peripheral edge of member 35 is provided with a face cam member 36 having axially recessed portions 37 in which engage complementary axial projections 38 of a cam member 39. Cam member 39 is secured to a brake drum 40, the periphery of which is adapted to be engaged by any suitable braking means such as the brake band 41. The peripheral portion of the brake drum is offset to overhang the member 35.

The hub portion 32 is exteriorly threaded to receive a collar 42 shouldered at 43 to form a bearing for the cam member 39. Collar 42 is provided with a flange 44 between which and the back of cam 39 is positioned a coiled spring 45 acting to keep the cams 36 and 39 in interengagement and force the clutch parts 31 and 35 into a slipping frictional engagement with friction plate 27. As previously stated, the drum 15 may slide on shaft 10 whereby the action of parts 31 and 35 on opposite faces of member 27 is substantially equalized. The force exerted by spring 45 may be adjusted by collar 42 within the limits of the bearing surface of shoulder 43, and is made sufficient to apply a slipping frictional engagement between the clutch members to maintain the trip cable taut. Normally the brake drum rotates with the member 35 due to the interengagement of the cams. When it is desired to actuate the dipper trip the brake band is tightened on the drum 40, causing relative movement between the cams so that the projections of cam 39, riding out of the recesses of cam 36, force the clutch parts 31 and 35 into driving engagement with member 27 to rotate drum 15 and wind in the tripping cable.

In order to convert the device for tag line operation it is only necessary to remove collar 42 and replace spring 45 with a stiffer spring capable of increasing the constant slipping frictional engagement of the clutch members to maintain the tag line taut.

The free faces of members 31 and 35 are provided with heat dissipating fins 47. By mounting the friction members 29 on plate 27 the heat caused by the constant slipping frictional engagement of the clutch members is generated at the face of members 31 and 35 and has only to pass through said members which are of metal, to be dissipated by the fins 47.

To remove the plate 27 for renewal of the friction members 29 it is only necessary to unscrew collar 42, when the brake drum and member 35 can be slipped from the shaft and member 27 released by removing screws 28.

It will further be seen that by nesting the power driven clutch parts beneath the offset flanges of the cable drum that the clutch member carried by the cable drum may take the form of a simple annular plate secured directly to the flange of the drum and an exceedingly compact structure of few parts is provided, the compactness being increased by offsetting the brake drum over the adjacent clutch member.

We claim:

1. A dipper trip tag line winder for power shovels which comprises, a power shaft, a drum rotatably mounted on said shaft and having peripheral flanges between which a dipper trip cable or tag line may be wound, a two-part friction clutch member secured to the shaft, said parts being movable toward and from each other, an annular plate secured to one flange of the drum and extending radially inward between the operating faces of the clutch parts, friction members secured to the opposite faces of said plate for engagement with the clutch parts, a spring acting to constantly urge the clutch parts into slipping frictional engagement with the friction members on said plate, means for forcing the clutch parts into driving relation with friction members on the plate, and fins on the outer faces of the clutch parts to dissipate the heat generated on the parts by their slipping engagement with the friction members of the plates.

2. A dipper trip or tag line winder for power shovels which comprises, a power shaft, a drum rotatably mounted on said shaft and having peripheral flanges between which a dipper trip cable or tag line may be wound, a two-part friction clutch member secured to the shaft, said parts being movable toward and from each other, an annular plate secured to one flange of the drum and extending radially inward between the operating faces of the clutch parts, friction members secured to the opposite faces of said plate for engagement with the clutch parts, a spring acting to constantly urge the clutch parts into slipping frictional engagement with the friction members on said plate, and means for forcing the clutch parts into driving relation with friction members on the plate, said drum having a sufficient degree of free longitudinal movement on the shaft to permit said plate to center itself between the clutch parts and substantially equalize the degree of frictional engagement between the parts and the friction members of the plate.

3. A dipper trip or tag line winder for power shovels which comprises, a power shaft, a drum rotatably mounted on said shaft and having peripheral flanges between which a dipper trip cable or tag line may be wound, a two-part friction clutch member secured to the shaft, said parts being movable toward and from each other, an annular plate secured to one flange of the drum and extending radially inward between the operating faces of the clutch parts, friction members secured to the opposite faces of said plate for engagement with the clutch parts, a spring acting to constantly urge the clutch parts into slipping frictional engagement with the friction members on said plate, and means for forcing the clutch parts into driving relation with friction members on the plate.

4. A dipper trip or tag line winder for power shovels which comprises, a power shaft, a drum rotatably mounted on said shaft and having peripheral flanges between which a dipper trip cable or tag line may be wound, a two-part friction clutch member secured to the shaft, said parts being movable toward and from each other, an annular plate secured to one flange of the drum and extending radially inward between the operating faces of the clutch parts, friction members secured to the opposite faces of said plate for engagement with the clutch parts, a spring acting to constantly urge the clutch parts into slipping frictional engagement with the friction members on said plate, means for forcing the clutch parts into driving relation with friction members on the plate, said drum having a sufficient degree of free longitudinal movement on the shaft to permit said plate to center itself between the clutch parts and substantially equalize the degree of frictional engagement between the parts and the friction members of the plate, and fins on the outer faces of the clutch parts to dissipate the heat generated on the parts by their slipping engagement with the friction members of the plates.

5. A dipper trip or tag line winder for power shovels which comprises a power shaft having a free end, a drum rotatably mounted on said shaft adjacent the free end, and having peripheral flanges between which a dipper trip cable or tag line may be wound, an annular plate secured to that flange of the drum adjacent the free end of the power shaft and extending radially inward toward the shaft, friction members secured to opposite sides of the plate, a clutch member having a hub portion fixed to the shaft and extending substantially to the free end thereof, the peripheral portion of said clutch member extending radially outwardly between the drum and said plate and engaging the friction member on the adjacent face of the latter, a second clutch member carried by the first clutch member for movement toward and from the latter, a brake actuated cam mechanism surrounding said hub for forcing the clutch members into driving relation with said plate, a spring normally maintaining the clutch members in slipping frictional engagement with said plate and a collar threaded on the hub for holding the parts in assembled relation.

6. A dipper trip and tag line winder for power shovels which comprises a power shaft, a drum rotatably mounted on said shaft and having peripheral flanges between which a dipper trip cable or tag line may be wound, one side face of the drum being recessed, a two-part friction clutch member secured to the shaft, said parts being movable toward and from each other, one part of said clutch member being nested in said recess to position the opposed operating faces of said parts substantially in the plane of the outer face of the adjacent peripheral flange of the drum, an annular friction member secured to said adjacent peripheral flange and extending radially inward between the operating faces of the parts of the clutch member, a spring constantly acting to urge the parts of the clutch member into a slipping frictional engagement with said annular member, and means for forcing the parts of said clutch member into driving relation with said annular friction member.

7. A dipper trip and tag line winder for power shovels which comprises a power shaft, a drum rotatably mounted on said shaft and having peripheral flanges between which a dipper trip cable or tag line may be wound, one side face of the drum being recessed, a two-part friction clutch member secured to the shaft, said parts being movable toward and from each other, one part of said clutch member being nested in said recess to position the opposed operating faces of said parts substantially in the plane of the outer face of the adjacent peripheral flange of the drum, an annular friction member secured to said adjacent peripheral flange and extending radially inward between the operating faces of the parts of the clutch member, a spring constantly acting to urge the parts of the clutch member into a slipping frictional engagement with said annular member, normally interengaging cam members operable by relative angular displacement to force the parts of said clutch member into driving relation with said annular friction member, and brake means for effecting such angular displacement of the cam members, said means including a brake drum, said drum forming a housing for the adjacent part of said clutch member.

8. A dipper trip and tag line winder for power shovels which comprises a power shaft, a drum rotatably mounted on said shaft and having peripheral flanges between which a dipper trip cable or tag line may be wound, one side face of the drum being recessed, a friction clutch member secured to the shaft and nested in said recess to position its operating face substantially in the plane of the outer face of the adjacent peripheral flange of the drum, an annular friction member secured to said adjacent peripheral flange and extending radially inward over the face of said clutch member, a second clutch member mounted on the first named clutch member for movement toward and from the latter and engaging the outer face of said annular member, a brake wheel having a band receiving peripheral drum portion offset toward said annular member to house said second clutch member, interengaging cam members respectively carried by said brake wheel and second clutch member, and causing the brake wheel to normally rotate with the clutch members, a spring acting to normally hold the said cam members in interengagement and to constantly force said second clutch member into a slipping frictional engagement with the said annular member to maintain the trip cable taut, and means to apply a braking force to the periphery of the brake drum to effect relative angular displacement of the cams and thereby force the clutch members into driving engagement with said annular friction member.

GEORGE G. MORIN.
EMILE J. CARLETON.